C. Peck.
Lifting Device for Drop Presses.

Nº 91,159. Patented Jun. 8, 1869.

Witnesses.
Rufus H. Sanford.
Frank Prescott.

Inventor:
Charles Peck.

United States Patent Office.

CHARLES PECK, OF NEW HAVEN, CONNECTICUT.

Letters Patent No. 91,159, dated June 8, 1869.

IMPROVED LIFTING-DEVICE FOR DROP-PRESSES AND HAMMERS.

The Schedule referred to in these Letters Patent and making part of the same.

*To all whom it may concern:*

Be it known that I, CHARLES PECK, of New Haven, county of New Haven, and State of Connecticut, have invented a new and useful Improvement in Lifting-Device for Drop-Presses or Hammers; and I do hereby declare the following to be a full, clear, and exact description of the same, reference being had to the accompanying drawings, and to the letters of reference marked thereon.

Said drawings constitute part of this specification, and represent, in—

Figure 1:
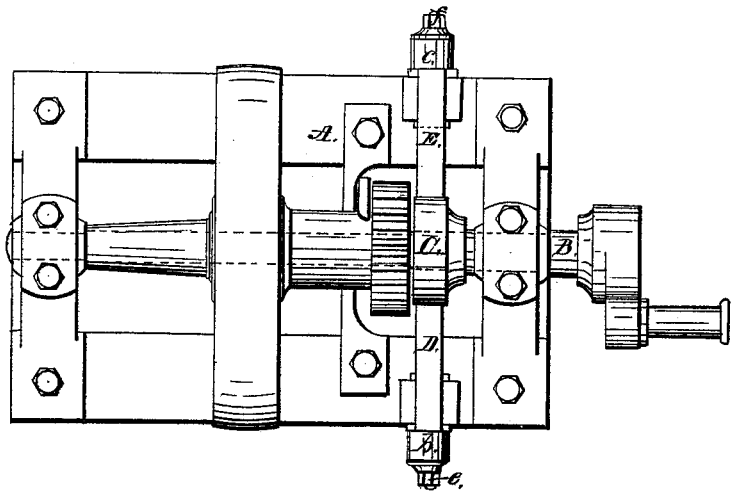

Figure 1, a top or plan view of my improvement; in

Figure 2:
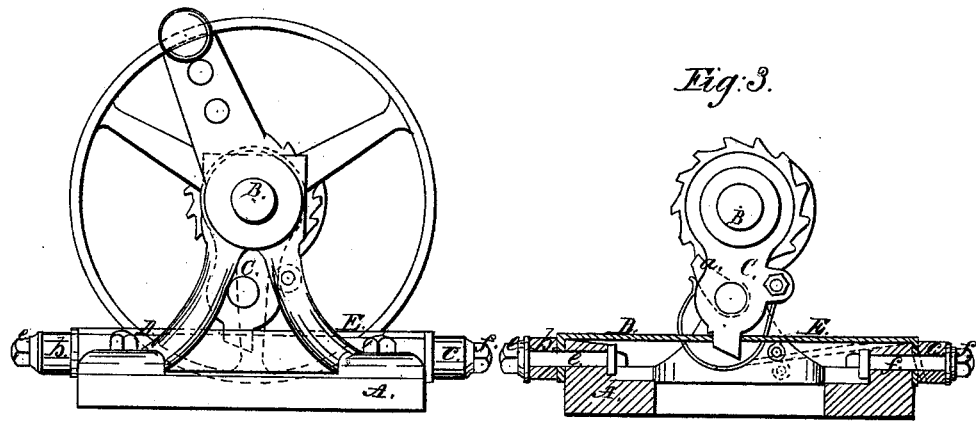

Figure 2, an end view of the same; in

Figure 3:
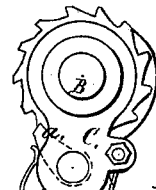
Figure 4:
Figure 5:
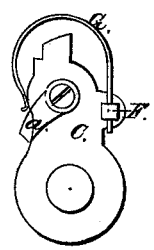

Figure 3, a cross-section of the frame, taken through the line $y\ y$, showing the method of holding and operating the locking-device; and in Figures 4 and 5, a section and front view of the sweep, showing the method of holding the spring which operates the dog.

Similar letters of reference, when they occur in the separate views, indicate like parts.

My invention relates to an improvement in the lifting-device for drop-presses or hammers, and consists in the particular construction and arrangement, to be presently described, of two pieces of metal, which I call lock-bars.

These said lock-bars are secured to the frame at their outer ends.

These ends are bent downward, at a right angle with the straight portion of the bars, and bored for the reception of a bolt, which holds them to the frame.

Around each of these bolts, and operating upon the end of the bar, a spring is placed, in order to allow for the working of the said bars.

The object of these bars is to lock and hold the crank, to which the drop-head or hammer is attached, in its upright position, and prevent any recoil of the same.

My invention also consists in holding and applying the spring which operates the dog upon the ratchet.

In the press made and patented by Milo Peck, of New Haven, Connecticut, in 1851, upon which my invention is an improvement, the locking-device consisted of a jointed bar, one end of which was secured to a spring upon the frame, and the other was provided with a latch, also fastened either to the frame or bar, and extending parallel with the said jointed bar; and stopping a little short of the latch at its inner extremity, a flat spring was placed.

Between this spring and the latch, the sweep was held, and the crank was thus kept in its upright position.

In this method another spring was also required to operate the latch-end of the said jointed bar, and throw it back into its place, after being drawn downward by the treadle to release the sweep. These springs and joints require a great deal of care in fitting and adjusting, in order that they may properly perform their work, and thus the use of this device is accompanied with considerable inconvenience.

In my invention, however, I have greatly simplified the construction and arrangement of this locking-device, and have produced one which is more easily constructed, and the use of which is accompanied with less wear and tear of machinery connected with it.

In the patent above referred to, the method of making and holding the spring, which operates the dog upon the ratchet, is also accompanied with a great deal of expense in fitting, it being fastened to the sweep, and curved over to strike the said dog. This necessitates not only the curving in a circular form, but also bending the same laterally. The fitting and tempering a spring, thus bent in two directions, is very inconvenient, and a great many are wasted in making.

In my improvement, a simple flat-curved spring can be used, it being held in a slotted bolt upon the sweep, as will be hereafter described.

To enable others skilled in the art to make and use my invention, I will proceed to describe the construction and operation of the same.

A is the frame, upon which bearings are placed for the reception of the shaft B.

Upon the end of the shaft B, a crank is placed, to which the drop-head or hammer is attached.

Also, upon this shaft B, and provided with a dog, $a$, the sweep C is securely fastened.

Just back of the said sweep C, and upon the same shaft, a ratchet, with a pulley or other driving-device, is placed and arranged to revolve loosely.

Thus far, the construction of my machine is the same as that hitherto used and patented by Milo Peck for the same purpose.

Fastened upon projections, (placed upon the frame A for the purpose,) and extending from these projections inward toward the centre, the two lock-bars D and E are placed.

The outer ends of these bars are provided with ears, or are bent downward, as before described, in order that they may be fastened to the projection, by means of bolts $e$ and $f$, which pass through the said projections, and the ears or extremities of the lock-bars.

Around the bolts $e$ and $f$, and arranged to operate upon the extremities of the two lock-bars D and E, two springs, $b$ and $c$, are placed, which are held in position by means of nuts and washers, placed for the purpose upon the said bolts, as shown in fig. 3.

The object of these said springs $b$ and $c$ is to keep the lock-bars in their proper horizontal position to receive the force of the blow, when the sweep C strikes one of the said bars, and also allow for any recoil that may be occasioned by the said sweep when it is thus suddenly stopped.

F is a bolt, which passes through the sweep C, through which it is securely fastened, in such a manner as not to turn therein.

In one end of this bolt F, a slot is formed for the reception of the spring G, as shown in fig. 4.

The spring G operates the dog $a$ upon the ratchet.

The object of this slotted bolt is to simplify the bending and fitting of the spring G.

This completes the construction of my improvement.

The operation is as follows:

When the drop-head or hammer has fallen upon the anvil, and has performed its work, the dog $a$ comes in contact with the ratchet, which revolves loosely upon the shaft, and the sweep, to which the said dog is attached, is by this means carried around. This imparts motion to the shaft B, and raises the crank, and drop head or hammer which is attached thereto.

The sweep, as it thus revolves, strikes one of the lock-bars D, and presses it downward.

The said sweep continues to revolve until it strikes the end of the other lock-bar E, as shown in fig. 3, when, at the same time, the dog $a$ is thrown out of the ratchet, by the incline placed for that purpose.

As soon as the sweep strikes the bar E, the other bar is forced up behind it, by the action of the spring $b$, and the said sweep is thus securely held in this position.

The momentum with which the sweep strikes the end of the bar E, is transmitted to the spring, which cushions the stroke, and prevents the jar upon the frame. Any recoil that there may be is in the same way transmitted by the other bar D to the spring attached to it.

To release the sweep, the bar E is drawn down by means of the treadle attached thereto, until it is brought below the lower extremity of the said sweep, as shown in red in fig. 3, when the weight of the drop-head or hammer carries it around until it is again acted on by the ratchet, as before described.

Immediately after the sweep has been released, if the foot is taken from the treadle, the spring $c$ will force the bar E back to its proper position, ready to receive the sweep on its return to the starting-point.

By turning the nuts upon the bolts $e$ and $f$, the tension of the springs $b$ and $c$ may be altered, in order that they may press more or less hard upon the extremities of the two lock-bars, as the case may require.

Having thus fully described my invention,

What I claim as new and useful, and desire to secure by Letters Patent, is—

1. The lock-bars D and E, in combination with the springs $b$ and $c$, bolts $e$ and $f$, and frame A, substantially as herein described.

2. The slotted bolt F, in combination with the sweep C, spring G, pawl $a$, and ratchet-wheel, arranged and operated in the manner substantially as herein described.

CHARLES PECK.

Witnesses:
RUFUS H. SANFORD,
FRANK PRESCOTT.